US010480390B2

(12) United States Patent
Miyamoto

(10) Patent No.: US 10,480,390 B2
(45) Date of Patent: Nov. 19, 2019

(54) WORK VEHICLE, AND POSITION ADJUSTMENT METHOD OF MOVABLE PORTION OF WORK VEHICLE

(71) Applicant: Komatsu Ltd., Tokyo (JP)

(72) Inventor: Hirofumi Miyamoto, Tokyo (JP)

(73) Assignee: Komatsu Ltd., Tokyo (JP)

( * ) Notice: Subject to any disclaimer, the term of this patent is extended or adjusted under 35 U.S.C. 154(b) by 345 days.

(21) Appl. No.: 15/533,504

(22) PCT Filed: Dec. 28, 2016

(86) PCT No.: PCT/JP2016/089078
§ 371 (c)(1),
(2) Date: Jun. 6, 2017

(87) PCT Pub. No.: WO2018/123011
PCT Pub. Date: Jul. 5, 2018

(65) Prior Publication Data
US 2018/0266303 A1  Sep. 20, 2018

(51) Int. Cl.
*B62D 25/10* (2006.01)
*F01P 5/06* (2006.01)
(Continued)

(52) U.S. Cl.
CPC ............... *F01P 5/06* (2013.01); *B60K 11/02* (2013.01); *B60K 11/04* (2013.01); *E02F 9/0808* (2013.01);
(Continued)

(58) Field of Classification Search
CPC ......... B60K 11/02; B60K 11/04; B60K 11/08; B60K 11/085; B62D 25/10; B62D 25/12; B62D 25/082; B62D 25/105; F01P 2070/50; F01P 2070/30; F01P 2070/52; F04D 29/622; F04D 29/703;
(Continued)

(56) References Cited

U.S. PATENT DOCUMENTS

| 3,800,472 | A | 4/1974 | Nagy |
| 6,167,977 | B1 * | 1/2001 | Adamson ............... B62D 25/10 16/289 |

(Continued)

FOREIGN PATENT DOCUMENTS

| CA | 1250501 A | 2/1989 |
| DE | 102008049681 A | 4/2010 |

(Continued)

*Primary Examiner* — James M Dolak
(74) *Attorney, Agent, or Firm* — Locke Lord LLP

(57) ABSTRACT

A work vehicle includes a blower unit rotatably supported to a vehicle body between a closed position and an open position, and a position adjustment portion configured to adjust a vertical position of the blower unit when the blower unit is at the closed position. The position adjustment portion includes a first plate that is provided on the vehicle body and includes a first through portion vertically penetrating, a second plate that is provided on the blower unit, vertically penetrates, and includes a second through portion communicating with the first through portion from below when the blower unit is at the closed position, and an adjustment bolt that includes a shaft portion inserted into the first through portion and the second through portion.

16 Claims, 11 Drawing Sheets

(51) Int. Cl.
 B60K 11/04 (2006.01)
 F01P 5/02 (2006.01)
 F04D 19/00 (2006.01)
 F04D 25/04 (2006.01)
 F04D 29/60 (2006.01)
 F04D 29/70 (2006.01)
 B60K 11/02 (2006.01)
 E02F 9/08 (2006.01)
 F04D 29/62 (2006.01)

(52) U.S. Cl.
 CPC .......... *E02F 9/0833* (2013.01); *E02F 9/0866* (2013.01); *E02F 9/0891* (2013.01); *F01P 5/02* (2013.01); *F04D 19/002* (2013.01); *F04D 25/04* (2013.01); *F04D 29/601* (2013.01); *F04D 29/622* (2013.01); *F04D 29/703* (2013.01); *B60Y 2200/417* (2013.01); *F01P 2070/50* (2013.01)

(58) Field of Classification Search
 CPC ........ F04D 29/601; F04D 29/70; F04D 29/60; E02F 9/0808; E02F 9/0833; E02F 9/0891; E02F 9/0866
 See application file for complete search history.

(56) References Cited

U.S. PATENT DOCUMENTS

| | | | | |
|---|---|---|---|---|
| 6,435,264 | B1 | 8/2002 | Konno et al. | |
| 7,080,428 | B2* | 7/2006 | Hyde | E05D 7/1061 16/231 |
| 7,255,189 | B2* | 8/2007 | Kurtz, Jr. | B60K 11/04 123/41.43 |
| 7,401,672 | B2* | 7/2008 | Kurtz, Jr. | B60K 11/04 180/165 |
| 7,753,152 | B2* | 7/2010 | Nakae | B60K 11/04 165/122 |
| 8,186,751 | B2* | 5/2012 | Davisdon | B60R 19/52 296/193.1 |
| 8,820,450 | B2* | 9/2014 | Naito | B60R 19/52 180/68.1 |
| 8,893,834 | B2* | 11/2014 | Berkeland | B62D 25/12 180/68.1 |
| 9,376,845 | B2* | 6/2016 | Sawaguchi | E05D 3/022 |
| 9,616,741 | B2* | 4/2017 | Opitz | B60K 11/04 |
| 10,233,819 | B2* | 3/2019 | Darling | F01P 5/02 |

FOREIGN PATENT DOCUMENTS

| | | |
|---|---|---|
| EP | 2698478 A1 | 2/2014 |
| JP | 55-125823 U | 9/1980 |
| JP | 60-201022 A | 10/1985 |
| JP | 61-114033 U | 7/1986 |
| JP | 03-017137 U | 2/1991 |
| JP | 04-071310 U | 6/1992 |
| JP | 06-039544 U | 5/1994 |
| JP | 06-049551 U | 7/1994 |
| JP | H11-034658 A | 2/1999 |
| JP | 2000-062474 A | 2/2000 |
| JP | 2004-142597 A | 5/2004 |
| JP | 2005-297644 A | 10/2005 |
| JP | 2006-183399 A | 7/2006 |
| JP | 2012-001996 A | 1/2012 |

* cited by examiner

WORK VEHICLE, AND POSITION ADJUSTMENT METHOD OF MOVABLE PORTION OF WORK VEHICLE

TECHNICAL FIELD

The present invention relates to a work vehicle.

BACKGROUND ART

Patent Document 1 discloses a wheel loader including a cooling unit having a radiator or the like and a blower unit blowing air to the cooling unit, as an example of a work vehicle.

In the blower unit of the wheel loader, one end of the blower unit is rotatably supported to a vehicle body to rotate between a closed position at which the blower unit faces the cooling unit from the rear side and an open position at which the blower unit exposes the cooling unit to the outside.

CITATION LIST

Patent Literature

[Patent Document 1] Japanese Unexamined Patent Application, First Publication No. 2004-142597

SUMMARY OF INVENTION

Technical Problem

As described above, one end of the blower unit of the work vehicle is supported in a cantilever manner. Accordingly, particularly, the portion of the other end side of the blower unit may be lower than an initially intended position due to the weight of the blower unit. In this case, it is necessary to perform a position adjustment which lifts the other end side of the blower unit which is a heavy item upward, which causes work to be complicated. In addition, the above-described problem similarly occurs in other movable portions in the work vehicle in addition to the blower unit.

The present invention is made in consideration of the above-described problem, and an object thereof is to provide a work vehicle and a position adjustment method of a movable portion of a work vehicle in which a position adjustment of a movable portion can be easily performed.

Solution to Problem

According to a first aspect of the present invention, a work vehicle includes: a vehicle body that includes an opening portion communicating between inside and outside; a movable portion that is rotatably supported to the vehicle body between a closed position at which the opening portion is closed and an open position at which the opening portion is open; and a position adjustment portion that is configured to adjust a vertical position of the movable portion when the movable portion is at the closed position, in which the position adjustment portion includes a first plate which is provided on the vehicle body and includes a first through portion which vertically penetrates, a second plate that is provided on the movable portion, vertically penetrates, and includes a second through portion communicating with the first through portion from below when the movable portion is at the closed position, and an adjustment bolt that includes a shaft portion which is inserted into the first through portion and the second through portion.

According to the work vehicle having the above-described configuration, since the first plate and the second plate are fastened by the adjustment bolt which is inserted into the first through portion and the second through portion, it is possible to allow the second plate to be close to the first plate. Accordingly, it is possible to lift the movable portion upward.

According to a second aspect of the present invention, a position adjustment method of a movable portion of a work vehicle, in which the work vehicle includes a vehicle body including an opening portion communicating between inside and outside, a movable portion that is rotatably supported to the vehicle body between a closed position at which the opening portion is closed and an open position at which the opening portion is open, and a position adjustment portion that is configured to adjust a vertical position of the movable portion when the movable portion is at the closed position, the position adjustment portion includes a first plate which is provided on the vehicle body and includes a first through portion which vertically penetrates, a second plate that is provided on the movable portion, vertically penetrates, and includes a second through portion communicating with the first through portion from below when the movable portion is at the closed position, and an adjustment bolt that includes a shaft portion inserted into the first through portion and the second through portion, the method includes: a positioning process of coinciding a horizontal position of the second through portion with a horizontal position of the first through portion by rotating the movable portion; and a lifting process of allowing the second plate to be close to the first plate by inserting the shaft portion of the adjustment bolt into the first through portion and the second through portion and fastening the adjustment bolt after the positioning process.

According to the position adjustment method of a movable portion, it is possible to easily lift the movable portion upward by allowing the second plate to be close to the first plate in the lifting process.

Advantageous Effects of Invention

According to the work vehicle and the position adjustment method of a movable portion of a work vehicle having the above-described aspects, it is possible to easily perform a positional adjustment of the movable portion.

DESCRIPTION OF EMBODIMENTS

First Embodiment

Hereinafter, an embodiment of a wheel loader as an example of a work vehicle according to the present invention will be described in detail with reference to FIGS. 1 to 10.

<Work Vehicle>

Figure 1:
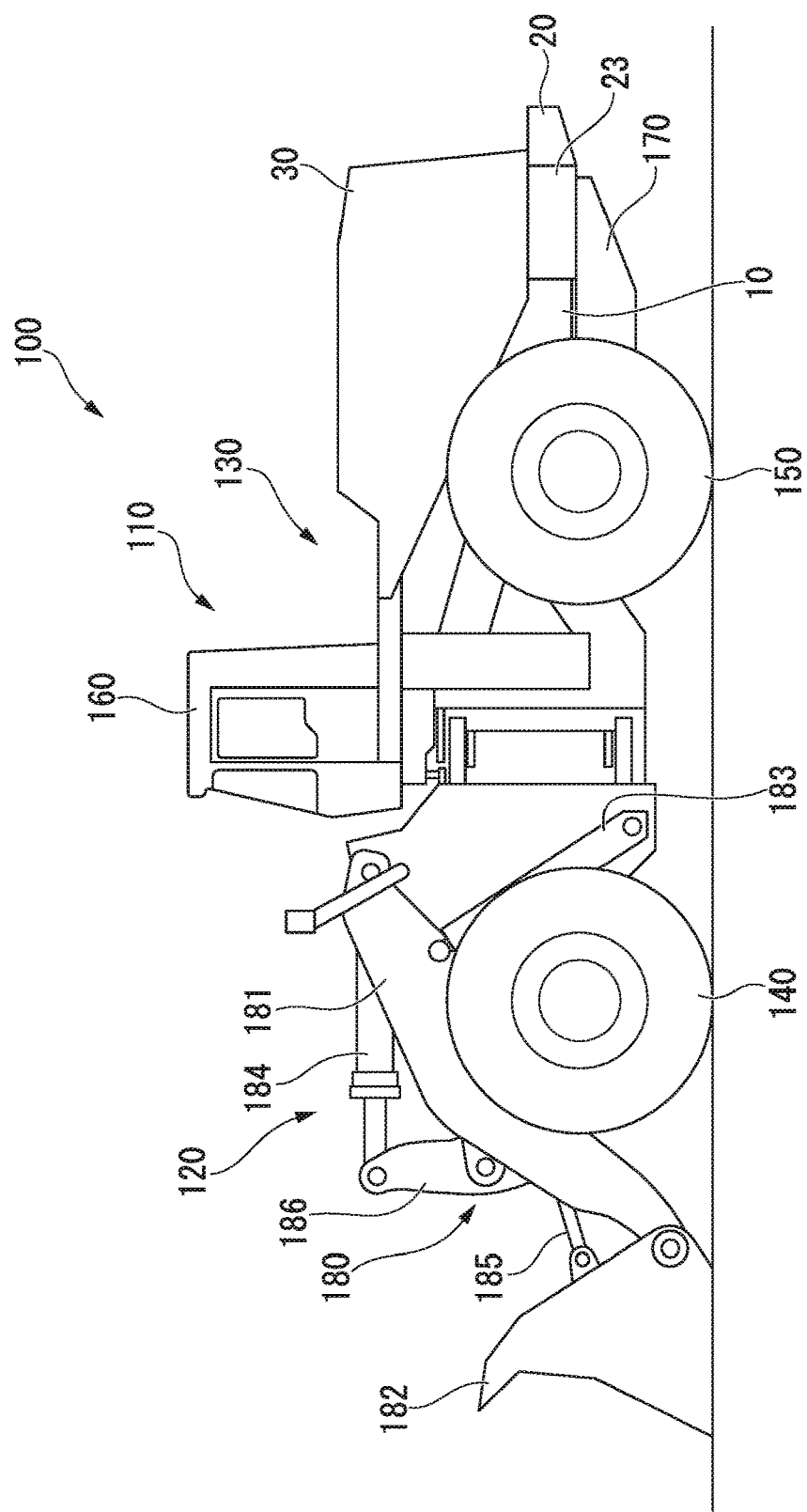
FIG. 1 is a side view of a wheel loader as a work vehicle according to a first embodiment of the present invention.
Figure 2:
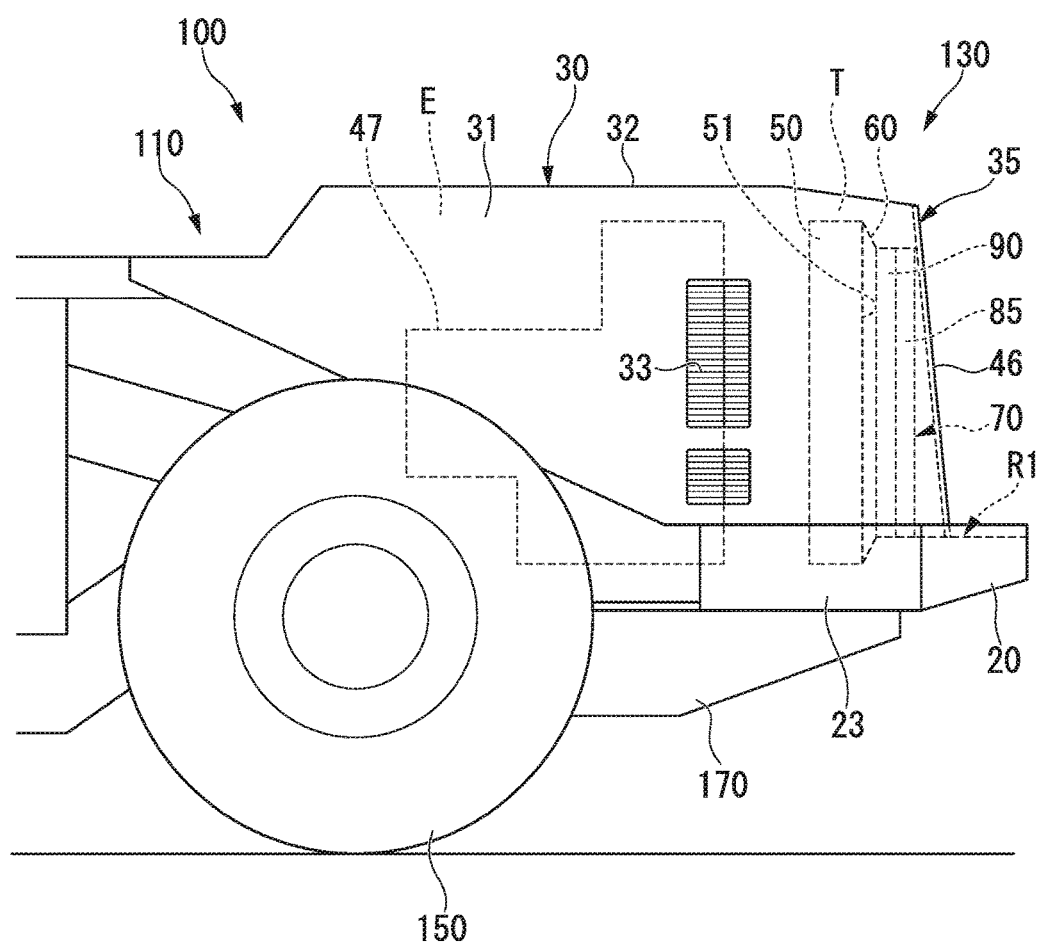
FIG. 2 is a side view of a vehicle rear portion of the wheel loader as the work vehicle according to the first embodiment of the present invention.

As shown in FIGS. 1 and 2, a wheel loader 100 as a work vehicle includes a vehicle body 110, a work equipment 180, an engine 47, a cooling unit 50, a fixation shroud 60, and a blower unit (movable portion) 70.

Figure 5:
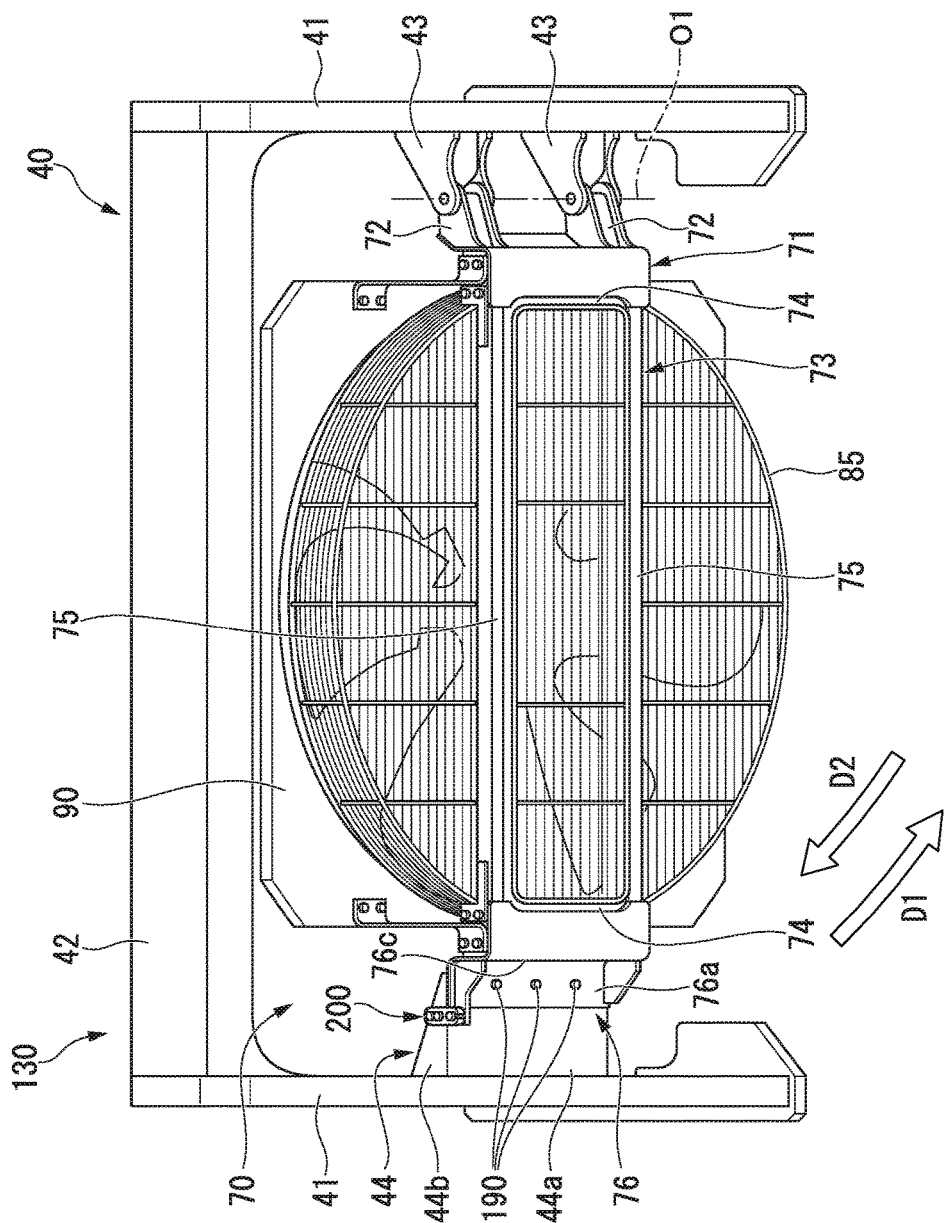
FIG. 5 is a perspective view when the blower unit and a support frame which supports the blower unit are viewed from the rear and above.
Figure 7:
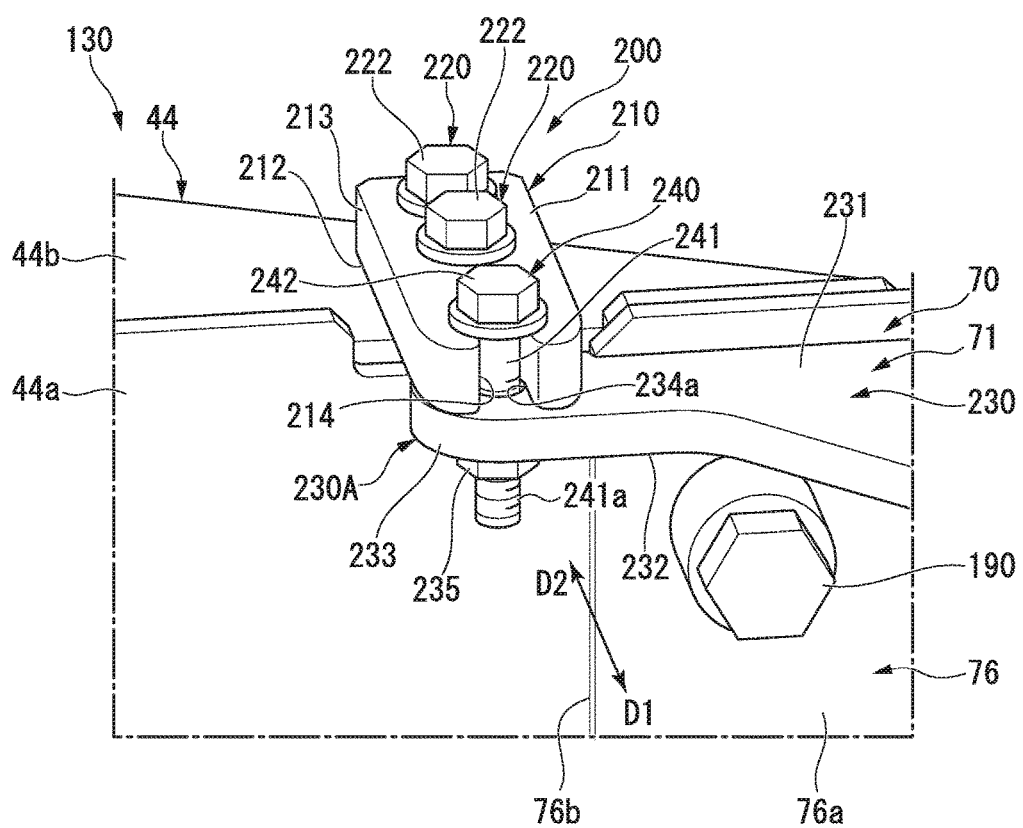
FIG. 7 is a perspective view of a position adjustment portion according to the first embodiment of the present invention.

As shown in FIGS. 5 and 7, the wheel loader 100 includes fixing bolts 190 for fixing the blower unit 70 to the vehicle body 110 and a position adjustment portion 200 which can perform a position adjustment of the blower unit 70 with respect to the vehicle body 110.

As shown in FIG. 1, the vehicle body 110 includes a vehicle front portion 120, a vehicle rear portion 130, front wheels 140, rear wheels 150, a cab 160, and a fuel tank 170. The vehicle front portion 120 configures a front portion of the vehicle body 110 and the vehicle rear portion 130 configures a rear portion of the vehicle body 110. The vehicle front portion 120 and the vehicle rear portion 130 are connected to be rotatable in a horizontal direction to each other.

The front wheels 140 are provided in the vehicle front portion 120 and the rear wheels 150 are provided in the vehicle rear portion 130. The vehicle body 110 moves forward and backward by driving the front wheels 140 and the rear wheels 150.

The cab 160 is provided to protrude upward on the portion on the front side of the vehicle rear portion 130. A driver seat is provided inside the cab 160.

The fuel tank 170 is provided below the vehicle rear portion 130, and a fuel is stored inside the fuel tank 170.

Hereinafter, a forward-backward direction, a front side, a rear side, and a width direction of the vehicle body 110 may be simply referred to as a "forward-backward direction", a "front side", a "rear side", and a "width direction", respectively. In addition, the width direction may be referred to as a "right side" or a "left side". In addition, a side toward the center in the width direction may be referred to as an "inside", and a side from the center in the width direction toward the right side or the left side may be referred to as an "outside".

The work equipment 180 is provided on a front side portion of the vehicle front portion 120 of the vehicle body 110. The work equipment 180 includes a boom 181 and a bucket 182. The boom 181 is connected to the vehicle body 110 to be rotatable. In addition, the bucket 182 is connected to one end of a bell crank 186 via a link 185. A bucket drive cylinder 184 is connected to the other end of the bell crank 186. The bucket 182 is connected to the tip of the boom 181 to be rotatable. The boom 181 is driven by a boom drive cylinder 183 and the bucket 182 is driven by the bucket drive cylinder 184. The boom drive cylinder 183 and the bucket drive cylinder 184 are driven by a hydraulic pressure supplied via a hydraulic circuit.

<Vehicle Rear Portion>

Hereinafter, a vehicle rear portion 130 will be described in more detail with reference to FIGS. 2 to 4.

The vehicle rear portion 130 includes a rear frame 10, a bumper 20, an exterior cover 30, a support frame 40, and a grille 46.

The rear frame 10 has a bar shape which extends in the forward-backward direction, and a pair of rear frames 10 is provided to be parallel to each other with an interval therebetween in the width direction.

<Bumper>

The bumper 20 is provided to extend in the width direction over the pair of rear frames 10 on the rear sides of the pair of rear frames 10. The bumper 20 may be directly fixed to the pair of rear frames 10, or may be fixed to the pair of rear frames 10 via another member such as an end plate provided over the pair of rear frames 10.

Figure 3:
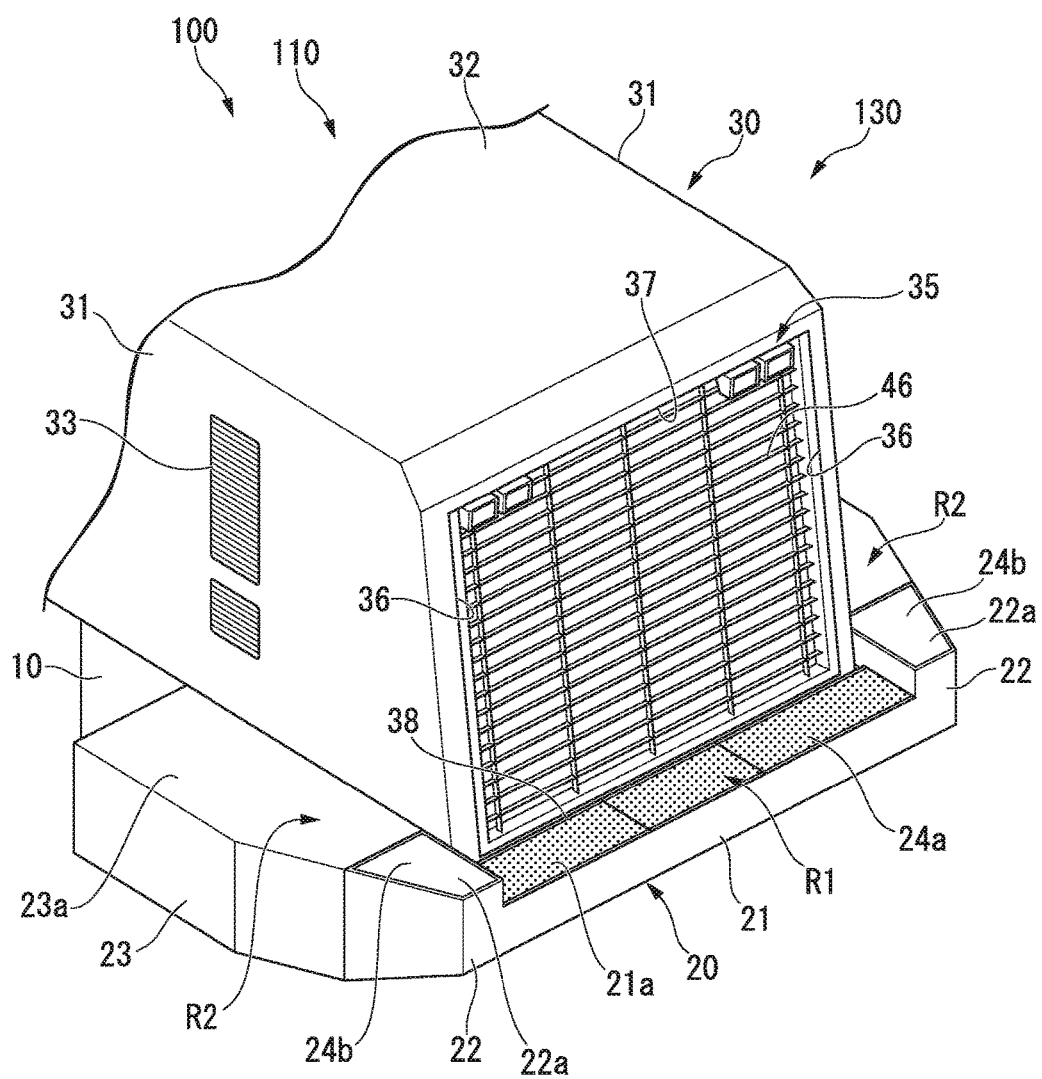
FIG. 3 is a perspective view of the vehicle rear portion of the wheel loader as the work vehicle according to the first embodiment of the present invention.

As shown in FIG. 3, in the bumper 20, the center portion in the width direction becomes a bumper center portion 21, and both right and left portions of the bumper center portion 21 become bumper side portions 22.

The bumper center portion 21 extends over a gap between outer sides of the pair of rear frames 10 in the width direction. An upper surface 21a of the bumper center portion 21 extends in the width direction so as to be parallel to a horizontal surface, and a portion on the upper surface 21a extends in the width direction and becomes a rear passage R1 through which a worker can pass. In the present embodiment, a nonslip mat 24a formed of a resin or the like is provided on the upper surface 21a of the bumper center portion 21, which becomes the rear passage R1, over the width direction of the vehicle body 110. The nonslip mat 24a may be a steel plate having an uneven surface.

The bumper side portions 22 are positioned further outside in the width direction than the outside of the rear frame 10 in the width direction and are provided on both end sides of the bumper center portion 21. An upper surface 22a of each of the bumper side portions 22 is parallel to the horizontal surface and is disposed so as to be higher by one step than the bumper center portion 21. Accordingly, a step is formed between the upper surface 22a of the bumper side portion 22 and the upper surface 21a of the bumper center portion 21.

For example, an accommodation portion 23 in which a device such as a battery can be accommodated is provided on the front sides of the bumper side portions 22 and the outside of the rear frame 10 in the width direction. The rear side of the accommodation portion 23 is in contact with the bumper side portion 22 and the inside of the accommodation portion 23 in the width direction is in contact with the rear frame 10. The accommodation portion 23 may be directly fixed to the rear frame 10 and may be fixed to the rear frame 10 via the end plate.

An upper surface 23a of the accommodation portion 23 has the same height as that of the upper surface 22a of the bumper side portion 22 and the upper surface 23a extends in the forward-backward direction so as to be parallel to the horizontal surface. The portion on the upper surface 23a of the accommodation portion 23 and the portion on the upper surfaces 22a of the bumper side portions 22 become a side passage R2 which extends on the bumper side portions 22 and the accommodation portion 23 in the forward-backward direction. Similarly to the rear passage R1, a nonslip mat 24b is provided on the upper surfaces 22a of the bumper side portions 22 and the upper surface 23a of the accommodation portion 23 which become the side passage R2.

<Exterior Cover>

Figure 4:
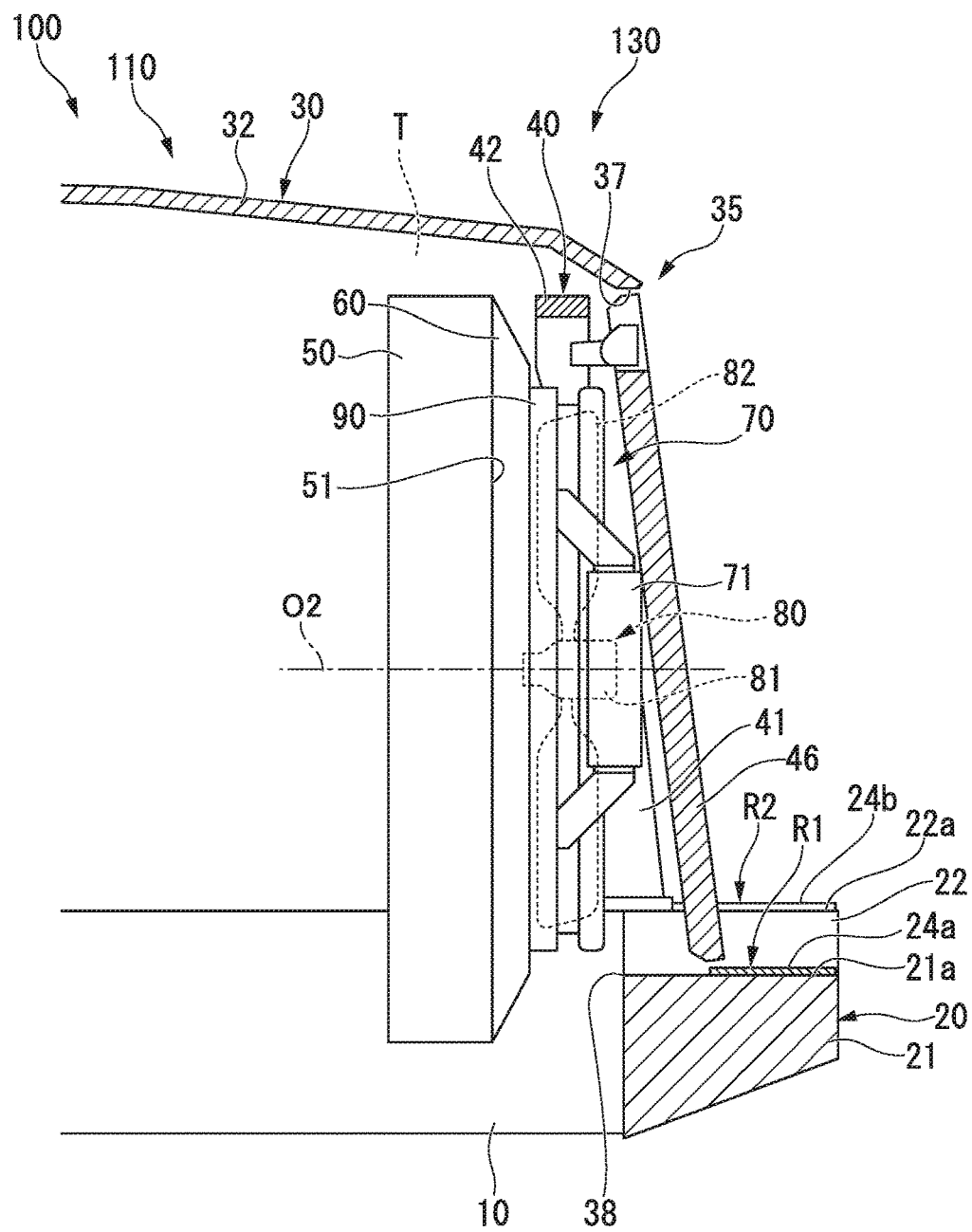
FIG. 4 is a side view of a cooling unit and a blower unit at a closed position in a state where the vehicle rear portion of the wheel loader as the work vehicle according to the first embodiment of the present invention is shown in a vertical section.

As shown in FIGS. 2 to 4, the exterior cover 30 includes a pair of side covers 31 and a top cover 32.

The pair of side covers 31 has a panel shape which extends in a vertical direction and the forward-backward direction and is provided with an interval therebetween in the width direction. Each of the lower ends of the pair of side covers 31 is fixed to each of the pair of corresponding rear frames 10 in the width direction.

The top cover 32 has a panel shape which extends in the forward-backward direction and the horizontal direction. Both ends of the top cover 32 in the width direction are connected to the upper ends of the pair of side covers 31 in the forward-backward direction.

An internal space is formed inside the exterior cover 30 by the exterior cover 30 including the pair of side covers 31 and the top cover 32. The front side portion of the internal space becomes an engine room E, and the rear side portion thereof becomes a heat exchange room T. A partition plate may be provided between the engine room E and the heat exchange room T such that air can flow through a portion between the engine room E and the heat exchange room T, or the engine room E and the heat exchange room T may communicate with each other without providing the partition plate. A ventilation portion 33 through which air can flow between the inside of the engine room F and the outside of the exterior cover 30 is formed at a location of the side cover 31 corresponding to the engine room E.

An opening portion 35 which penetrates the inside and the outside and exposes the heat exchange room T to the rear side is formed on the rear end of the exterior cover 30. The opening portion 35 has a rectangular shape in which the rear ends extending in the vertical direction in the side covers 31 become side edge portions 36, the rear end extending in the width direction in the top cover 32 becomes an upper edge portion 37, and the front end extending in the width direction on the upper surface 21a of the bumper center portion 21 becomes a lower edge portion 38. That is, the opening portion 35 is formed to be partitioned by the rear end of the exterior cover 30 and the front end of the bumper 20. The rear passage R1 is positioned to extend in the width direction along the lower edge portion 38 of the opening portion 35 on the rear side of the opening portion 35.

<Support Frame>

Figure 6:
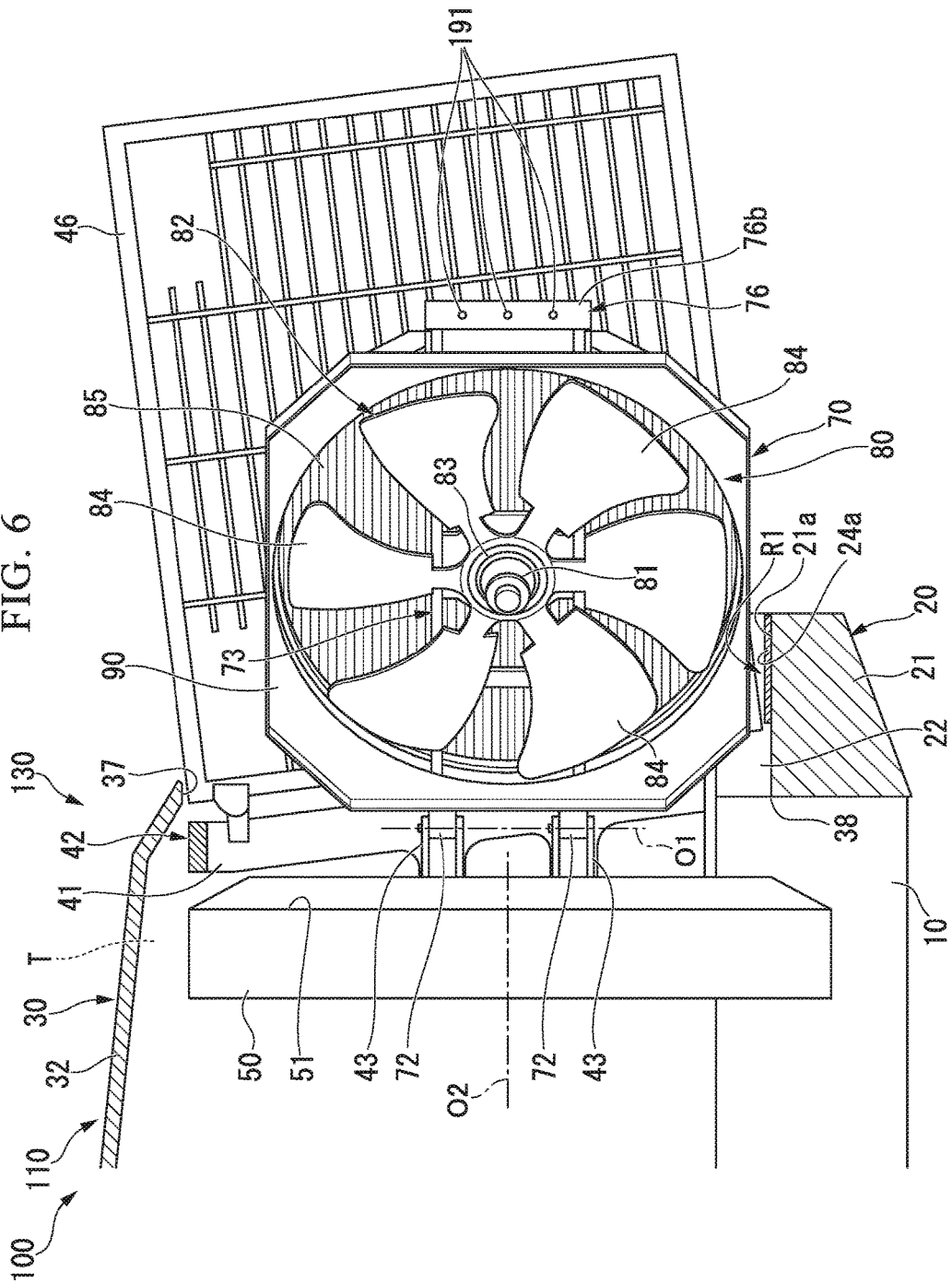
FIG. 6 is a side view of the cooling unit and the blower unit at an open position in a state where the vehicle rear portion of the wheel loader as the work vehicle according to the first embodiment of the present invention is shown in a vertical section.

As shown in FIGS. 4 to 6, the support frame 40 is a gate-shaped member provided at a position on the rear side of the heat exchange room T inside the exterior cover 30, that is, a position on the opening portion 35 side. The support frame 40 has a function of supporting the blower unit 70. As shown in FIG. 5, the support frame 40 includes a pair of side frames 41, an upper frame 42, rotating brackets 43, and a fixing bracket 44.

The pair of side frames 41 has a bar shape extending in the vertical direction and is provided with an interval therebetween in the width direction. The lower end of each of the pair of side frames 41 is fixed to the corresponding rear frame 10 in the width direction. The pair of side frames 41 is disposed along the inner surfaces of the corresponding side covers 31. The side cover 31 may be fixed to the outside of the side frame 41 in the width direction. The pair of side frames 41 is provided along the side edge portions 36 of the opening portion 35 to approach the side edge portions 36.

The upper frame 42 has a bar shape which extends over the pair of rear frames 10 in the width direction so as to connect the upper ends of the pair of rear frames 10 to each other. The top cover 32 of the exterior cover 30 may be fixed to the upper surface of the upper frame 42. The upper frame 42 is provided along the upper edge portion 37 of the opening portion 35 to approach the upper edge portion 37.

Each of the rotating brackets 43 has a function of rotatably supporting the blower unit 70. The rotating brackets 43 are integrally provided on one (the side frame 41 on the right side in the width direction) of the pair of side frames 41. The rotating brackets 43 are provided to protrude further inside in the width direction from the surface of the side frame 41 facing the inside in the width direction. A plurality of (two in the present embodiment) rotating brackets 43 are provided at intervals therebetween in the vertical direction, that is, the extension direction of the side frame 41. Hole portions which extend along a rotation axis O1 extending in the vertical direction are formed in the rotating brackets 43. Holes of the plurality of rotating brackets 43 are positioned on the same rotation axis O1.

Since the rotating brackets 43 are disposed on one side in the width direction in the heat exchange room T, the rotation axis O1 passing through the rotating bracket 43 is disposed on one side in the width direction in the heat exchange room T. The rotation axis O1 extends in the vertical direction along the side edge portion 36 on one side of the opening portion 35 in the width direction.

The fixing bracket 44 has a function of supporting the blower unit 70, which is detachably fixed to the fixing bracket 44 in a fixed state. The fixing bracket 44 is integrally provided on the other (the side frame 41 on the left side in the width direction) of the pair of side frames 41. The fixing bracket 44 is provided to protrude further inside from the surface of the side frame 41 facing the inside in the width direction.

A surface of the fixing bracket 44 facing the rear side becomes an abutment surface 44a. The abutment surface 44a has a planar shape which extends in the width direction and the vertical direction.

A surface of the fixing bracket 44 which is connected to the upper end of the abutment surface 44a and extends from the upper end of the abutment surface 44a toward the front side becomes an upper end surface 44b. The upper end surface 44b extends to be parallel to the horizontal surface.

<Grille>

As shown in FIGS. 3, 4, and 6, the grille 46 is rotatably supported to the support frame 40. The grille 46 has a lattice shape which includes a plurality of bar-shaped members, and the outline of the grille 46 is formed in a rectangular shape corresponding to the shape when the opening portion 35 is viewed in the forward-backward direction. The grille 46 can rotate between a closed state where the opening portion 35 of the vehicle rear portion 130 is closed and an open state where the opening portion is open. The grille 46 is provided to be at a posture inclined frontwards toward the front side in a state where the grille 46 closes the opening portion 35. The grille 46 is supported to be rotatable around an axis which extends in the vertical direction and is inclined frontward with respect to one (the side frame 41 on the right side in the width direction) of the pair of side frames 41.

<Engine>

As shown in FIG. 2, the engine 47 is provided in the engine room E which is the front side portion of the internal space of the exterior cover 30. The engine 47 is driven by a fuel supplied from the fuel tank 170. A driving force of the engine 47 is transmitted to the front wheels 140 and the rear wheels 150 via a shaft or the like. Accordingly, the wheel loader 100 moves forward and backward. The driving force of the engine 47 is transmitted to a hydraulic pump (not shown). A hydraulic oil pressurized by the hydraulic pump is supplied to hydraulically driven devices such as the boom drive cylinder 183 or the bucket drive cylinder 184 via a hydraulic circuit. The engine 47 has a water-cooled structure.

<Cooling Unit>

As shown in FIGS. 2 and 4, the cooling unit 50 is provided in the heat exchange room T inside the exterior cover 30. The cooling unit 50 is provided on the front side from the above-described opening portion 35 or support frame 40.

The cooling unit 50 includes cooling devices such as a radiator, an oil cooler, or an after-cooler, and an outer frame in which the cooling devices are accommodated. The outer frame has a rectangular parallelepiped shape in which the shape viewed from the front side and the rear side is a rectangular shape. A surface which is formed of a plurality of radiating tubes in the radiator is exposed from a rear surface 51 of the cooling unit 50 facing the rear side.

<Fixation Shroud>

As shown in FIGS. 2, 4 and 6, the fixation shroud 60 is a member provided on the rear side of the cooling unit 50 in the heat exchange room T of the vehicle rear portion 130. The fixation shroud 60 is an annular member which surrounds a reference axis O2 which extends in the forward-backward direction. The reference axis O2 is an axis which extends in the forward-backward direction passing through the center of the rear surface 51 of the cooling unit 50. The fixation shroud 60 has a function of guiding air which flows inside from the front side of the cooling unit 50 and flows from the rear surface 51 of the cooling unit 50 to the rear side, further backward. The diameter of the inner peripheral surface of the fixation shroud 60 decreases toward the rear side. Accordingly, in a flow path inside the fixation shroud 60, a cross-sectional area of the flow path orthogonal to the reference axis O2 decreases toward the rear side.

<Blower Unit>

As shown in FIGS. 2, and 4 to 6, the blower unit 70 is supported to be rotatable around the rotation axis O1 with respect to the vehicle rear portion 130 on the rear side of the fixation shroud 60. The blower unit 70 has a function of supplying air for cooling the cooling unit 50 to the cooling unit 50. The blower unit 70 is supported to be rotatable between a closed position at which the blower unit 70 faces the rear surface 51 of the cooling unit 50 from the rear side and an open position at which the blower unit 70 exposes the rear surface of the cooling unit.

The blower unit 70 includes a movable bracket 71, a fan 80, a guard portion 85, and a movable shroud 90.

<Movable Bracket>

The movable bracket 71 is rotatably supported with respect to the vehicle rear portion 130 and has a function of supporting the fan 80, the movable shroud 90, and the guard portion 85. As shown in FIG. 5, the movable bracket 71 includes rotation connection portions 72, a bracket body 73, and a fixing connection portion 76.

As shown in FIGS. 5 and 6, the rotation connection portions 72 are connected to the rotating brackets 43 of the support frame 40 to be rotatable around the rotation axis O1. The movable bracket 71 has a pair of rotation connection portions 72 corresponding to the pair of the rotating brackets 43. For example, each of the rotation connection portions 72 is connected to each rotating bracket 43 to be rotatable via a pin inserted into a hole portion along the rotation axis O1 of the rotating bracket 43.

The rotation connection portions 72 are integrally fixed to the one end of the bracket body 73. The bracket body 73 extends from the inside in a radial direction of a virtual circle having the axis O1 as a center toward the outside in the radial direction, with one end fixed to the rotation connection portions 72 as a base end. As shown in FIGS. 4 and 5, a state where the bracket body 73 extends in the width direction is the closed position of the blower unit 70. As shown in FIG. 6, a state where the bracket body 73 rotates from the closed position toward the rear side of the vehicle rear portion 130 around the rotation axis O1 and the bracket body 73 diagonally extends to the rear side from the rotation axis O1 is the open position of the blower unit 70.

Hereinafter, among the rotation directions around the axis O1, a direction (a direction in which the blower unit 70 rotates from the closed position toward the open position) form the closed position toward the open position is referred to as a rotation direction outside D1, and a direction (a direction in which the blower unit 70 rotates from the open position toward the closed position) from the open position toward the closed position is referred to as a rotation direction inside D2.

The fixing connection portion 76 is provided on the other end of the bracket body 73. As shown in FIG. 5, when the blower unit 70 is at the closed position, the fixing connection portion 76 is detachably fixed to the fixing bracket 44.

A surface of the fixing connection portion 76 facing the rotation direction outside D1, that is, a surface thereof facing the rear side when the blower unit 70 is at the closed position becomes an outer surface 76a. A surface of the fixing connection portion 76 facing the rotation direction inside D2 becomes an inner surface 76b (refer to FIG. 6). When the blower unit 70 is as the closed position, the inner surface 76b of the fixing connection portion 76 abuts on the abutment surface 44a of the fixing bracket 44 to face the abutment surface 44a. The abutment surface 44a and the inner surface 76b have planar shapes which extend in a vertical surface and are in surface-contact with each other.

The fixing connection portion 76 includes an outer end surface 76c which has a planar shape facing the outside in the radial direction of a virtual circle having the axis O1 as a center. The outer end surface 76c is the end portion of the rotation direction inside D2, and is connected to the end portion of the outer surface 76a on the inside in the radial direction of the virtual circle.

In addition, in the present embodiment, as shown in FIG. 5, when in the closed position, the bracket body 73 has a frame shape including a pair of vertical frame portions 74 which is disposed so as to be separated from each other on the right and left sides in the width direction and extends in the vertical direction, and a pair of horizontal frame portions 75 which connects the pair of the vertical frame portions 74 to each other in the width direction and is disposed so as to be separated from each other in the up-and-down direction. The rotation connection portions 72 are provided on one of the pair of vertical frame portions 74, and the fixing connection portion 76 is provided on the other.

<Fan>

As shown in FIGS. 4 and 6, the fan 80 includes a hydraulic motor 81 and a fan body 82.

The hydraulic motor 81 is rotationally driven by the hydraulic oil supplied via a hydraulic cable (not shown) from the hydraulic pump. The hydraulic motor 81 is fixed to a portion of the bracket body 73. The hydraulic motor 81 is fixed to a portion between the pair of horizontal frame portions 75 in the bracket body 73 of the movable bracket 71. The hydraulic motor 81 is disposed to protrude from the bracket body 73 toward the front side. The hydraulic motor 81 is configured such that a drive shaft rotates when the hydraulic oil is supplied to the hydraulic motor 81. In a case where the blower unit 70 is at the closed position, an axis of the drive shaft of the hydraulic motor 81 coincides with the reference axis O2.

The fan body 82 is rotationally driven by the hydraulic motor 81 to blow air. As shown in FIG. 6, the fan body 82 includes an attachment portion 83 attached to the drive shaft of the hydraulic motor 81, and a plurality of (six in the present embodiment) blades 84 fixed to the outer peripheral portion of the attachment portion 83 and provided at intervals therebetween in the circumferential direction of the drive shaft.

In a case where the blower unit 70 is positioned at the closed position, the fan 80 of the blower unit 70 faces the rear surface 51 of the cooling unit 50 from the rear side. If the hydraulic motor 81 is driven in this state, the fan body 82 rotates, and a flow of air from the front side toward the rear side is generated.

<Guard Portion>

As shown in FIGS. 4, 5 and 6, the guard portion 85 is a member which covers the fan 80 from the rear side and the outside of the fan 80 in the radial direction. Similarly to the grille 46 portion, the guard portion 85 has a lattice shape including a plurality of bar-shaped members and is integrally fixed to the movable bracket 71. The guard portion 85 ensures safety when the fan 80 rotates while the obstruction in the flow of air is prevented.

<Movable Shroud>

As shown in FIGS. 4 to 6, the movable shroud 90 is integrally provided on the blower unit 70 along with the fan 80. The movable shroud 90 has a tubular shape which covers the fan body 82 of the fan 80 from the outer periphery side and has a function of introducing air to the fan body 82.

When the blower unit 70 is at the closed position, the blower unit 70 faces the rear surface 51 of the cooling unit 50 from the rear side. At this case, since the movable shroud 90 is connected to the rear side of the fixation shroud 60, a flow path which continues from the rear surface 51 of the cooling unit 50 toward the rear side is formed inside the fixation shroud 60 and the movable shroud 90. In this way, in the present embodiment, the shroud through which air is introduced to the fan 80 is configured of a segmented structure including the fixation shroud 60 and the movable shroud 90.

When the blower unit 70 rotates from the closed position to the open position, the blower unit 70 does not interfere with the side edge portions 36, the upper edge portion 37, and the lower edge portion 38 of the opening portion 35 of the vehicle rear portion 130. That is, each size of the fan 80, the movable shroud 90, and the guard portion 85 configuring the blower unit 70 is set to be capable of passing through the opening portion 35.

<Fixing Bolt>

As shown in FIGS. 5, 7 to 9, each of the fixing bolts 190 has a function of fixing the blower unit 70 to the vehicle body 110 via hole portions formed on the blower unit 70 side and the vehicle body 110 side.

Figure 9:
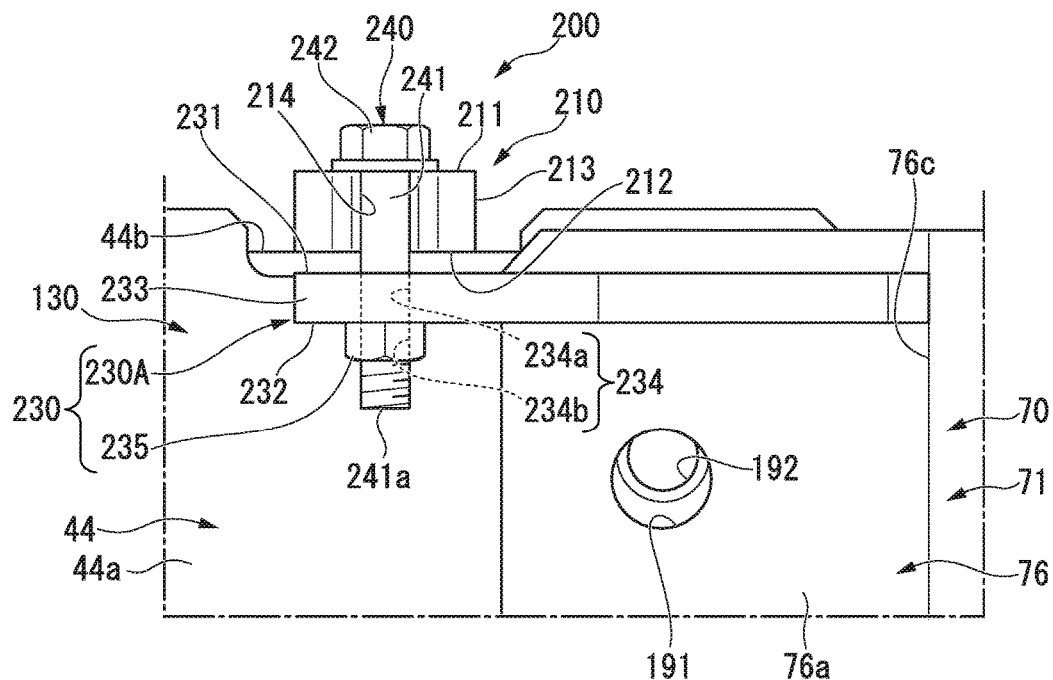
FIG. 9 is a view when a state of the position adjustment portion according to the first embodiment of the present invention before a lifting process is performed is viewed from the rear side.
Figure 10:
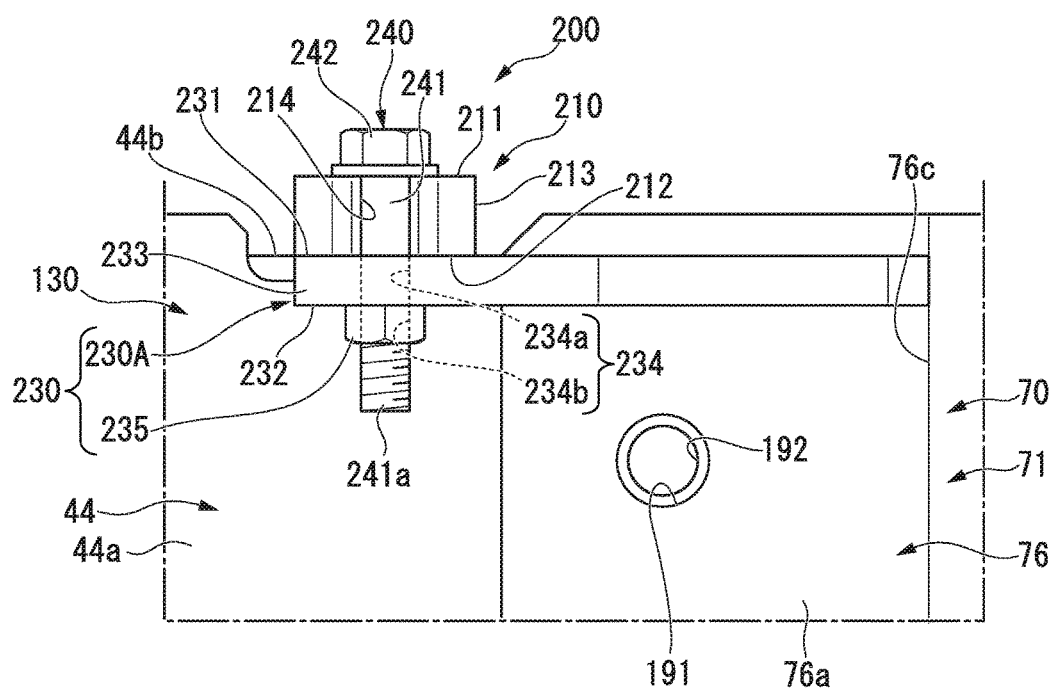
FIG. 10 is a view when a state of the position adjustment portion according to the first embodiment of the present invention after the lifting process is performed is viewed from the rear side.

As shown in FIGS. 9 and 10, a movable-side through-hole 191 which penetrates the outer surface 76a and the inner surface 76b is formed on the fixing connection portion 76 in the movable bracket 71 of the blower unit 70 as a hole portion on the blower unit 70 side. When the blower unit 70 is at the closed position, the movable-side through-hole 191 penetrates the fixing connection portion 76 in the forward-backward direction. A plurality of (three in the present embodiment) movable-side through-holes 191 are formed with intervals therebetween in the vertical direction.

As shown in FIGS. 9 and 10, a vehicle-side fixation hole 192 which is recessed from the abutment surface 44a toward the front side is formed on the abutment surface 44a of the fixing bracket 44 of the support frame 40 as a hole portion formed on the vehicle body 110 side. The vehicle-side fixation hole 192 is formed at a position corresponding to the movable-side through-hole 191 in a case where the blower unit 70 is at the closed position. When the blower unit 70 is positioned at an appropriate vertical position at the closed position, as shown in FIG. 10, a communication state is realized in which the center axis of each vehicle-side fixation hole 192 and the center axis of each movable-side through-hole 191 are coaxially disposed. A female screw is formed on the inner peripheral surface of the vehicle-side fixation hole 192 and can be fastened to the male screw of the fixing bolt 190.

When the blower unit 70 is at the closed position, each fixing bolt 190 passes through the movable-side through-hole 191 from the rotation direction outside D1 toward the rotation direction inside D2 and is inserted into the vehicle-side fixation hole 192. In this case, the fixing bolt 190 is fastened to the vehicle-side fixation hole 192. The vehicle-side fixation hole 192 is formed to have a size in which a head portion of the fixing bolt can abut on the outer surface 76a of the fixing connection portion 76 when the fixing bolt 190 is fastened. Accordingly, in a state where each fixing bolt 190 is fastened to each vehicle-side fixation hole 192, the inner surface 76b of the fixing connection portion 76 abuts on the abutment surface 44a of the fixing bracket 44 so as to come into surface-contact with the abutment surface 44a.

<Position Adjustment Portion>

Next, the position adjustment portion 200 will be described. The position adjustment portion 200 has a function of adjusting the vertical position of the blower unit 70 by lifting the closed blower unit 70 upward.

As shown in FIGS. 7 to 10, the position adjustment portion 200 includes a first plate 210, positioning bolts 220, a second plate 230, and an adjustment bolt 240.

<First Plate>

The first plate 210 has a plate shape including an upper surface 211, a lower surface 212, and a side surface 213.

The upper surface 211 and the lower surface 212 are disposed to be parallel to each other on the horizontal surface and have the same shape as each other in a plan view when viewed from above. The vertical direction in which the upper surface 211 and the lower surface 212 face each other is a thickness direction of the first plate 210 having a plate shape. The side surface 213 extends in the vertical direction and connects the entire outer peripheries of the upper surface 211 and the lower surface 212 to each other.

A first through portion 214 penetrating the first plate 210 from the upper surface 211 to the lower surface 212 in the thickness direction is formed in the first plate 210. The first through portion 214 of the first plate 210 is opened in the vertical direction from a portion of the side surface 213 in the horizontal direction. That is, the first through portion 214 has a groove shape in which a portion of the side surface 213 is formed to be recessed, and has a U-shaped notch shape in a plan view when viewed from above. The first through portion 214 is constantly formed in the vertical direction.

Figure 8:
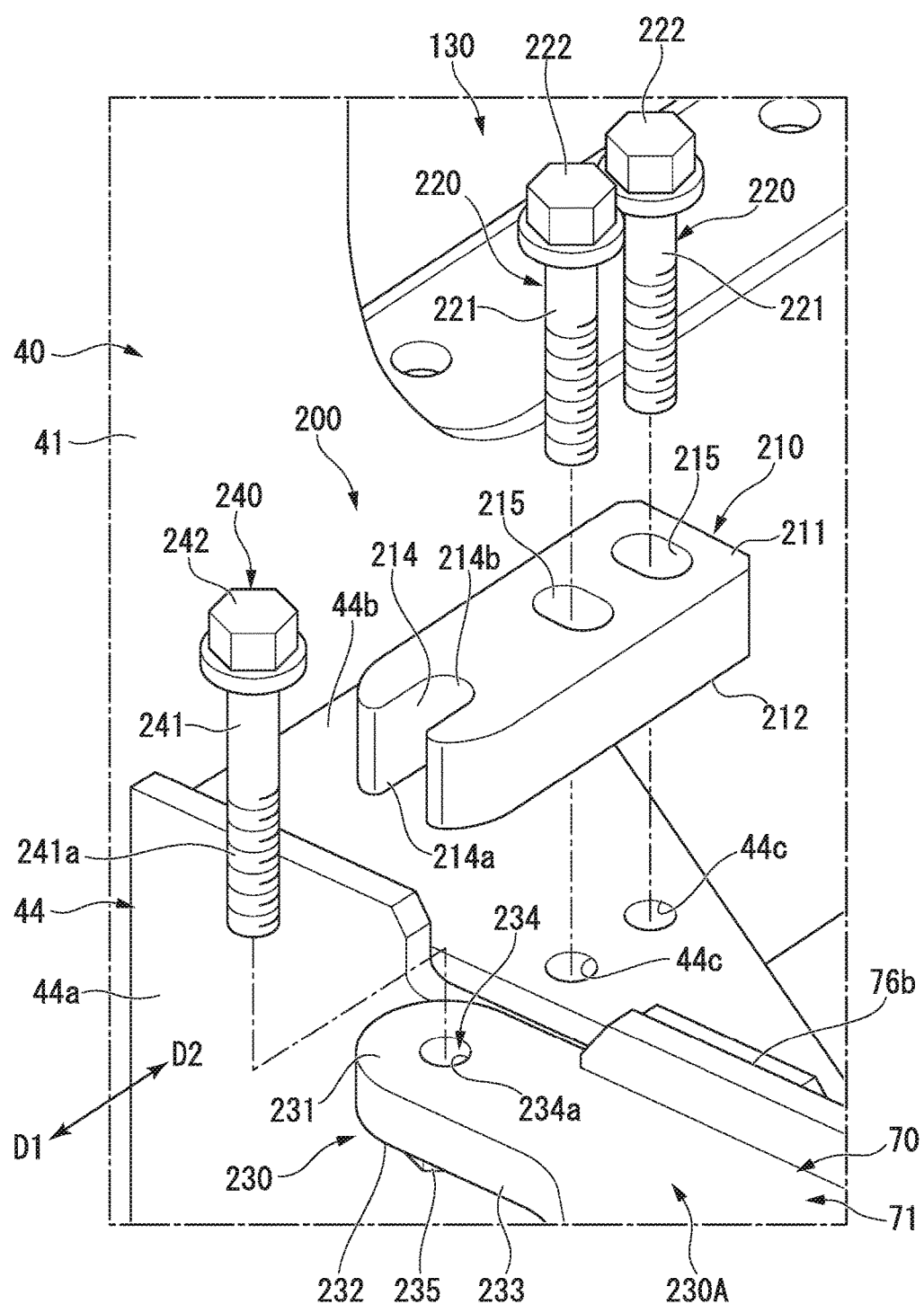
FIG. 8 is an exploded perspective view of the position adjustment portion according to the first embodiment of the present invention.

As shown in FIG. 8, a plurality of (two in the present embodiment) long holes 215 are formed in the first plate 210. Similarly to the first through portion 214, each of the long holes 215 penetrates the first plate 210 from the upper surface 211 to the lower surface 212 in the thickness direction. The long hole 215 is formed to be separated from the first through portion 214 in the direction in which the first through portion 214 is recessed from the side surface 213. The plurality of long holes 215 are disposed at intervals therebetween in the direction in which the first through portion 214 is recessed from the side surface 213. Each of the long holes 215 has the direction in which the first through portion 214 is recessed from the side surface 213 as a lateral direction and has the horizontal direction orthogonal to the lateral direction as a longitudinal direction. The long hole 215 is constantly formed in the vertical direction.

The shape of the first plate 210 of the present embodiment in a plan view has a direction in which the first through portion 214 and the plurality of long holes 215 are arranged (the direction in which the first through portion 214 is recessed from the side surface 213) as a longitudinal direction, and has the direction orthogonal to the longitudinal direction as a lateral direction. Accordingly, the first through portion 214 is formed on one end of the first plate 210 in the longitudinal direction to be recessed from the one end. The long holes 215 are formed to be closer to the other end side in the longitudinal direction than the first through portion 214 in the first plate 210.

<Positioning Bolt>

Each of the positioning bolts 220 has a function of fixing the first plates 210 to the vehicle body 110 side. As shown in FIG. 8, each of the positioning bolts 220 includes a shaft portion 221 which passes through each long hole 215 of the first plate 210 from above. A diameter of the shaft portion 221 of the positioning bolt 220 is smaller than a size of the long hole 215 in the lateral direction. Accordingly, the shaft portion 221 of the positioning bolt 220 passing through the long hole 215 can moves to some extent not only in the longitudinal direction of the long hole 215 but also in the lateral direction thereof.

A diameter of a head portion 222 of the positioning bolt 220 is larger than the size of the long hole 215 in the lateral direction. Accordingly, the head portion 222 of the positioning bolt 220 abuts on the upper surface 211 of the first plate 210 in a state where the long hole 215 passes through the positioning bolt 220.

The shaft portion 221 of the positioning bolt 220 is inserted into a bolt fixing hole 44c formed on the vehicle body 110 side in the state where the shaft portion passes through the long hole 215 of the first plate 210. The shaft portion 221 is fixed by being fastened to the bolt fixing hole 44c. The bolt fixing hole 44c is formed on the upper end surface 44b of the fixing bracket 44 of the support frame 40 configuring the vehicle body 110. A plurality of bolt fixing holes 44c (two in the present embodiment) are formed so as to correspond to the long holes 215. The bolt fixing holes 44c are formed at intervals therebetween in the forward-backward direction. The interval of the plurality of the bolt fixing holes 44c is provided to correspond to the interval of the plurality of long holes 215 of the first plate 210.

As shown in FIG. 7, in a state where the first plate 210 is fixed to the vehicle body 110 by the positioning bolts 220, the longitudinal direction of the first plate 210 coincides with the forward-backward direction. As shown in FIG. 8, in the first through portion 214, an opening portion 214a in the horizontal direction faces the rear side, that is, the opening portion 214a faces the rotation direction outside D1. An end portion 214b of the first through portion 214 in the rotation direction inside D2 further protrudes rearward than the rear end of the upper end surface 44b of the fixing bracket 44. Accordingly, access can be performed with respect to the first through portion 214 from above and below.

In the state where the first plate 210 is fixed to the vehicle body 110, the longitudinal direction of the long hole 215 coincides with the direction intersecting the rotation direction (D1 or D2), and in the present embodiment, the longitudinal direction coincides with the width direction.

<Second Plate>

As shown in FIGS. 7 to 10, the second plate 230 includes a second plate body 230A and a nut member 235.

The second plate body 230A has a plate shape which includes the upper surface 231, a lower surface 232, and a side surface 233.

The upper surface 231 and the lower surface 232 are disposed to be parallel to the horizontal surface, and the side surface 233 is connected to the upper surface 231 and the lower surface 232. The second plate body 230A is fixed to the blower unit 70. In the present embodiment, in the second plate body 230A, a portion of the side surface is fixed to the outer surface 76a and the outer end surface 76c in the fixing connection portion 76 of the movable bracket 71. The fixing method of the second plate body 230A with respect to the movable bracket 71 can adopt a well-known method such as welding or bolts.

A through-hole 234a which penetrates from the upper surface 231 to the lower surface 232 in the thickness direction is formed in the second plate body 230A, and the through-hole 234a has a circle in a plan view when viewed from above. The through-hole 234a has a constant shape in the vertical direction.

The nut member 235 is fixed to the lower surface 232 of the second plate body 230A. As shown in FIGS. 9 and 10, the nut member 235 is a ring-shaped member having a female screw-hole 234b in which a female screw is formed on the inner peripheral surface. For example, the nut member 235 is integrally fixed to the lower surface of the second plate body 230A by welding in a state where the center axis of the female screw-hole 234b coincides with the center axis of the through-hole 234a of the second plate body 230A.

In the second plate 230 which includes the second plate body 230A and the nut member 235, a second through portion 234 which vertically penetrates the second plate 230 is configured by the through-hole 234a of the second plate body 230A and the female screw-hole 234b of the nut member 235. Accordingly, in the second through portion 234, a female screw is formed by the female screw-hole 234b of the nut member 235.

When the blower unit 70 is at the closed position, the second through portion 234 is positioned below the first through portion 214 of the first plate 210 and communicates with the first through portion 214 in the vertical direction.

As shown in FIGS. 7 to 10, the adjustment bolt 240 includes a shaft portion 241 and a head portion 242. The shaft portion 241 has a diameter to be inserted into the first through portion 214 and the second through portion 234. A male screw 241a is formed on one end side in the outer peripheral surface of the shaft portion 241. The male screw 241a can be fastened to the male screw of the second through portion 234, that is, the female screw-hole 234b of the nut member 235. The head portion 242 is integrally provided on the other end in the extension direction of the shaft portion 241.

In a state where the head portion 242 of the adjustment bolt 240 faces upward, the adjustment bolt 240 is inserted into the first through portion 214 and the second through portion 234. In this case, the male screw 241a of the shaft portion 241 of the adjustment bolt 240 is fastened to the female screw of the second through portion 234, and the head portion 242 of the adjustment bolt 240 abuts on the upper surface 211 of the first plate 210 from above.

<Operation and Effect>

When the wheel loader 100 is operated, as shown in FIG. 4, the blower unit 70 is at the closed position, and the opening portion 35 of the vehicle rear portion 130 is closed by the grille 46. If the fan body 82 of the blower unit 70 rotates, ventilation is performed from the inside of the heat exchange room T formed by the exterior cover 30 toward the rear side via the opening portion 35. Accordingly, air which flows into the engine room E or the heat exchange room T via the ventilation portion 33 or the like of the exterior cover 30 flows toward the rear side so as to pass through the cooling unit 50 inside the heat exchange room T. The air in which the temperature increases by cooling the cooling unit 50 flows through the flow path, which is formed by the fixation shroud 60 and the movable shroud 90, toward the rear side via the fan 80. Thereafter, the air is discharged from the opening portion 35 of the vehicle rear portion 130 via the grille 46.

In a case where the blower unit 70 is at the closed position, the blower unit 70 is fixed to the vehicle body 110 by the fixing bolts 190. That is, since the fixing bolts 190 pass through the movable-side through-holes 191 and are fixed to the vehicle-side fixation holes 192, the blower unit 70 cannot rotate at the closed position.

In this state, as shown in FIGS. 7 and 10, the head portion 242 of the adjustment bolt 240 of the position adjustment portion 200 comes into contact with the upper surface 211 of the first plate 210, and the shaft portion 241 is inserted into the first through portion 214 and the second through portion 234. The male screw 241a of the shaft portion 241 is fastened to the female screw of the second through portion 234.

Here, since the wheel loader 100 loads earth and sand, crushed stones, or the like to transport these, if the wheel loader 100 is used in the work, the wheel loader 100 is exposed to an environment where there are clouds of dust. Accordingly, the dust is attached to the blower unit 70 or the cooling unit 50. Therefore, cleaning is performed as part of a maintenance work with respect to the blower unit 70 and the cooling unit 50.

Figure 11:
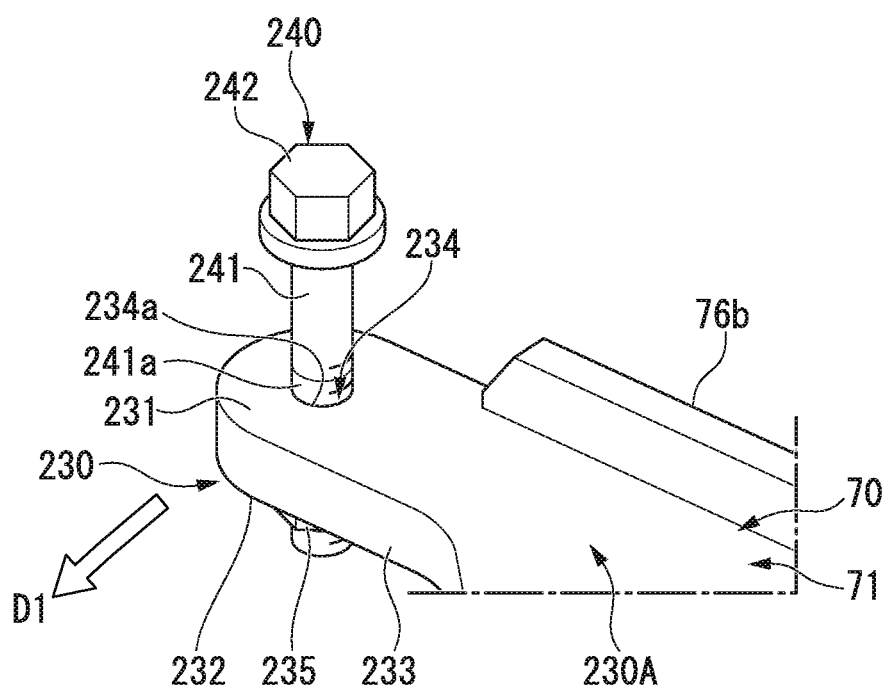
FIG. 11 is a perspective view for explaining an aspect in which the blower unit rotates in a state where an adjustment bolt is inserted into a second plate in the first embodiment of the present invention.

When the maintenance work is performed, the fixed state of the blower unit 70 by the fixing bolts 190 is released. That is, the blower unit 70 can rotate by removing the fixing bolts 190. Simultaneously, since the adjustment bolt 240 of the position adjustment portion 200 is loosened, an abutment state of the head portion 242 of the adjustment bolt 240 with respect to the upper surface 211 of the first plate 210 is released. Thereafter, the blower unit 70 rotates toward the rotation direction outside D1. In this case, the adjustment bolt 240 moves along with the blower unit 70 in a state of being inserted into the second plate 230. As shown in FIG. 11, the blower unit 70 can rotate toward the rotation direction outside D1 in a state where the male screw 241a of the adjustment bolt 240 is fastened to the female screw-hole 234b of the second through portion 234. Since the first through portion 214 of the first plate 210 has a U-shaped notch shape which is opened toward the rotation direction outside D1, the movement of the adjustment bolt 240 is not blocked by the first plate 210. In addition, since the adjustment bolt 240 is fastened to the second through portion 234, the adjustment bolt 240 does not fall from the second plate 230.

In addition, a ring-shaped stopper may be provided on the tip of the male screw 241a such that the adjustment bolt 240 and the second plate 230 are not separated from each other at all times. That is, since the ring-shaped stopper is provided, the tip of the male screw 241a of the shaft portion 241 is fastened in a state of being not completely separated from the female screw-hole 234b if the adjustment bolt 240 is loosened.

In this way, since the blower unit 70 rotates to the open position, a worker can perform maintenance with respect to the blower unit 70, the fixation shroud 60, and the rear surface 51 of the cooling unit 50 on the rear passage R1.

After the maintenance work ends, the blower unit 70 rotates to the rotation direction inside D2 so as to be returned to the original state.

Here, the blower unit 70 is a heavy item which includes a hydraulic motor, a fan, or the like and is supported to the vehicle body 110 in a cantilever manner. Accordingly, particularly, the other end side of the blower unit 70 opposite to one end thereof which is rotatably supported may be lower than an initially intended position due to the weight of the blower unit. If the other end side of the blower unit 70 is lowered, as shown in FIG. 9, the movable-side through-hole 191 and the vehicle-side fixation hole 192 for inserting the bolt serving as the fixing bolt 190 are not matched to each other, and thus the bolt cannot be inserted.

With respect to this, in the present embodiment, the vertical position of the blower unit 70 is adjusted by a position adjustment method of the blower unit 70 having the movable portion.

Figure 12:
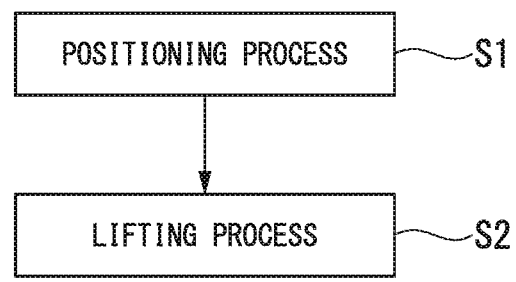
FIG. 12 is a flowchart showing a procedure of a position adjustment method of a movable portion of a work vehicle according to the first embodiment of the present invention.

A procedure of the position adjustment method of the blower unit 70 will be described with reference to a flowchart shown in FIG. 12. The position adjustment method of the blower unit 70 of the present embodiment includes a positioning process S1 and a lifting process S2.

In the positioning process S1, since the blower unit 70 rotates around the rotation axis O1, the horizontal position of the second through portion 234 coincides with the horizontal position of the first through portion 214.

In the present embodiment, the positioning process S1 is performed in a state where the tip of the shaft portion 241 of the adjustment bolt 240 is fastened to the second through portion 234 of the second plate 230. Accordingly, if the second plate 230 rotates to the closed position, as shown in FIG. 9, a portion of the shaft portion 241 of the adjustment bolt 240 is fitted into the first U-shaped through portion 214 of the first plate 210. Therefore, the horizontal positions of the first through portion 214 and the second through portion 234 automatically coincide with each other.

In this step, a gap in the vertical direction exists between the lower surface 212 of the first plate 210 and the upper surface 231 of the second plate 230. That is, the second plate 230 is lowered with respect to the first plate 210 according to the lowering due to the weight of the blower unit 70. In addition, the positions of the holes of the movable-side through-hole 191 and the vehicle-side fixation hole 192 in the vertical direction do not coincide with each other.

The lifting process S2 is performed after the positioning process S1. In the lifting process S2, the head portion 242 of the adjustment bolt 240 is rotated using a tool or the like to fasten the adjustment bolt 240. If the adjustment bolt 240 is fastened, the head portion 242 of the adjustment bolt 240 comes into contact with the upper surface of the first plate 210, and subsequently, the relative positions between the head portion 242 of the adjustment bolt 240 and the second plate 230 approach each other. As a result, the second plate 230 is lifted to approach the first plate 210. Accordingly, as shown in FIG. 10, the gap between the first plate 210 and the second plate 230 in the vertical direction is eliminated, and the lower surface 212 of the first plate 210 and the upper surface 231 of the second plate body 230A abut on each other. The blower unit 70 to which the second plate 230 is fixed is positioned at the initially intended vertical position.

As a result, the hole positions of the movable-side through-hole 191 and the vehicle-side fixation hole 192 in the vertical direction coincide with each other, and the fixing bolts 190 can be inserted into the movable-side through-holes 191 and the vehicle-side fixation holes 192. The blower unit 70 is fixed to the vehicle body 110 by the fixing bolts 190, and subsequently, the grille 46 is closed, and the maintenance work ends.

As described above, according to the present embodiment, since the first plate 210 and the second plate 230 are fastened by the adjustment bolt 240 which is inserted into the first through portion 214 and the second through portion 234, it is possible to allow the second plate 230 to be close to the first plate 210. Accordingly, it is possible to lift the blower unit 70 having a large weight upward without using a tool such as a claw bar or an offset wrench.

Particularly, in the present embodiment, the male screw 241a of the shaft portion 241 of the adjustment bolt 240 engages with the female screw of the second plate 230, and the head portion 242 of the adjustment bolt 240 abuts on the first plate 210 from above. Therefore, if the adjustment bolt 240 rotates, the second plate 230 is lifted so as to approach the first plate 210. Accordingly, in a case where the second plate 230 is positioned below the initially intended position, it is possible to lift the second plate 230 to the intended position.

Since the first through portion 214 is opened to the rotation direction outside D1, when the blower unit 70 moves between the open position and the closed position, it is possible to move the shaft portion 241 of the adjustment bolt 240 to the inside and the outside of the first through portion 214 in the state where the shaft portion 241 of the adjustment bolt 240 is fastened to the second plate 230. Accordingly, since it is not necessary to perform an operation for inserting and removing the adjustment bolt 240, it is possible to perform the position adjustment operation more easily.

Since the second through portion 234 is positioned below the first through portion 214 when the shaft portion 241 of the adjustment bolt 240 is fitted into the first through portion 214, it is possible to easily perform positioning of the first through portion 214 and the second through portion 234.

The first plate 210 with respect to the vehicle body 110 can be positioned via the long holes 215. That is, in a case where the position of the first through portion 214 of the first plate 210 is deviated from a rotation locus of the second through portion 234 of the second plate 230, it is possible to possible to adjust the position of the first plate 210 with respect to the vehicle body 110. That is, it is possible to dispose the first through portion 214 at an appropriate position by loosening the positioning bolts 220 to move the first plate 210 within ranges of the long holes 215.

Accordingly, even in a case where a dimensional error and an assembling error of each component or a positional deviation due to aging occurs and the first through portion 214 and the second through portion 234 cannot perform positioning, it is possible to appropriately set the relative position between the first through portion 214 and the second through portion 234 by performing the position adjustment of the first plate 210 with respect to the vehicle body 110. In addition, this can be also used when the initial position of the first plate 210 with respect to the vehicle body 110 is determined.

Since the long holes 215 extends in the width direction, that is, extends in the direction intersecting the rotation direction, even in a case where the first through portion 214 is deviated from the rotation locus of the second through portion 234, it is possible to adjust the position of the first through portion 214 such that the first through portion 214 is positioned on the rotation locus.

Since the opening direction of the first through portion 214 can be changed, it is possible to adjust the posture of the first plate 210 with respect to the first through portion 214 such that the shaft portion 241 inserted into the second through portion 234 is smoothly fitted into the first through portion 214.

The fixation of the blower unit 70 with respect to the vehicle body 110 can be performed by the fixing bolts 190 which are inserted into the vehicle-side fixation holes 192 and the movable-side through-holes 191. Even in the case where the positions of the vehicle-side fixation holes 192 and the movable-side through-holes 191 are deviated from each other due to the weight of the blower unit 70, it is possible to perform the positioning of the vehicle-side fixation holes 192 and the movable-side through-holes 191 by lifting the position of the blower unit 70 using the position adjustment portion 200.

Since the position adjustment portion 200 and the fixing bolts 190 are separately configured from each other, a load generated when the blower unit 70 which is a heavy item is fixed is not applied to the position adjustment portion 200.

Second Embodiment

Figure 13:
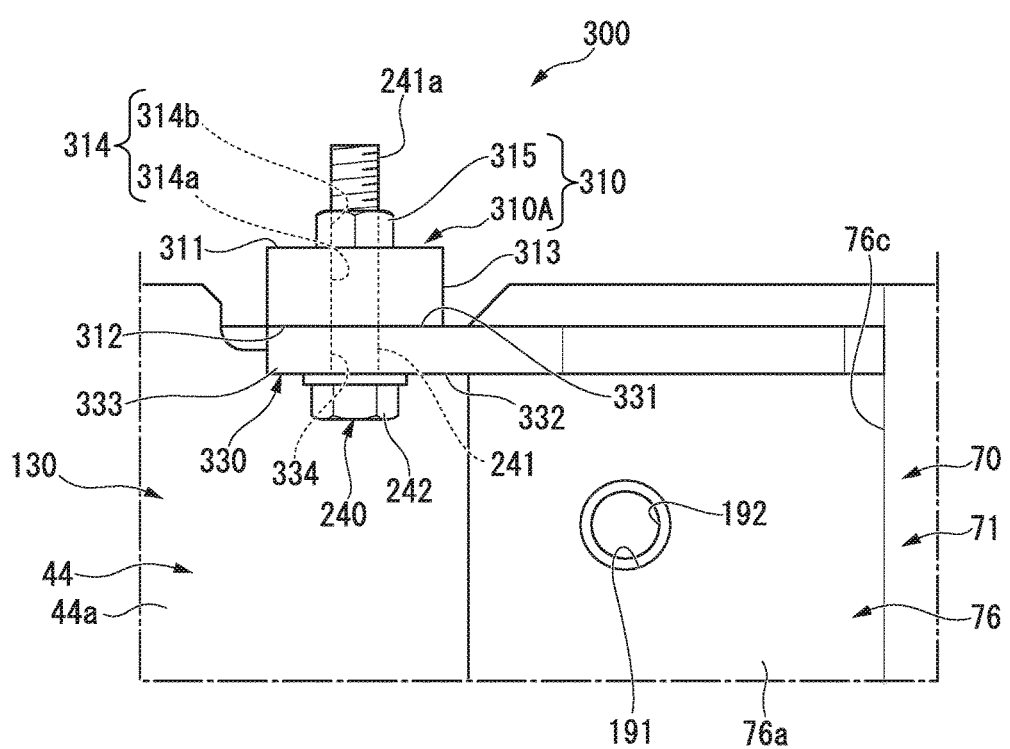
FIG. 13 is a view when a state where a position adjustment portion according to a second embodiment of the present invention after a lifting process is performed is viewed from the rear side.

Hereinafter, a second embodiment of the present invention will be described with reference to FIG. 13. In the second embodiment, the same reference numerals are assigned to components similar to those of the first embodiment, and detail descriptions thereof are omitted. A configuration of a position adjustment portion 300 of the second embodiment is different from that of the first embodiment.

A first plate 310 of the second embodiment includes a first plate body 310A and a nut member 315.

The first plate body 310A has a circular through-hole 314a is a plan view when viewed from above. The nut member 315 is integrally fixed to an upper surface 311, which is the upper surface of the first plate body 310A, welding or the like. The through-hole 314a and a female screw-hole 314b of the nut member 315 are coaxially disposed. A first through portion 314 which penetrates the through-hole 314a of the first plate body 310A and the female screw-hole 314b of the nut member 315 in the vertical direction is formed. The first plate body 310A includes an upper surface 311, a lower surface 312, and a side surface 313.

A second plate 330 of the second embodiment includes an upper surface 331, a lower surface 332, and a side surface 333. The second plate 330 includes a second through portion 334 which vertically penetrates the second plate 330 and is opened to the rotation direction inside D2. That is, the second through portion 334 has a U-shaped notch shape in a plan view when viewed from above and extends to have a constant shape in the vertical direction.

The first through portion 214 of the first embodiment corresponds to the second through portion 334 of the second embodiment, and the second through portion 234 of the first embodiment corresponds to the first through portion 314 of the second embodiment.

The adjustment bolt 240 is inserted into the first through portion 314 and the second through portion 334 in a state where the head portion 242 face downward and the tip of the shaft portion 241 faces upward. That is, the adjustment bolt 240 is inserted into the second through portion 334 and the first through portion 314 in this order from below. The male screw 241a of the shaft portion 241 of the adjustment bolt 240 is fastened to the female screw of the first through portion 314, that is, the female screw-hole 314b of the nut member 315. The head portion 242 of the adjustment bolt 240 abuts on the lower surface 332 of the second plate 330 from below.

Similarly to the first embodiment, in the second embodiment, it is possible to allow the second plate 330 to be close to the first plate 310 by rotating the head portion 242 of the adjustment bolt 240. Accordingly, it is possible to easily lift the blower unit, which is integrated with the second plate 330, upward.

Particularly, in a case where the position adjustment portion 300 is positioned at a high location, it is possible to operate the adjustment bolt 240 from below, which improves workability.

Other Embodiments

Hereinbefore, the embodiments of the present invention are described. However, the present invention is not limited to this and can be appropriately modified within a scope which does not depart from the technical idea of the present invention.

For example, in the first embodiment, the first through portion 214 has a U shape in a plan view. However, the first through portion 214 may have a circular shape in a plan view. In this case, the adjustment bolt 240 may be temporarily removed when opening or closing the blower unit 70. In the positioning process S1, the adjustment bolt 240 may be temporarily removed as long as the adjustment bolt 240 is positioned to the position at which the first through portion 214 and the second through portion 234 communicate with each other when viewed in the vertical direction, that is, to the horizontal position at which the shaft portion 241 of the adjustment bolt 240 can be inserted into the first through portion 214 and the second through portion 234.

In the second embodiment, the second through portion 334 has a U shape in a plan view. However, similarly to the above, the second through portion 334 may have a circular shape in a plan view.

In the first embodiment, the through-hole 234a of the second plate body 230A configuring the second through portion 234 may have a U shape in a plan view. In the second embodiment, the through-hole 314a of the first plate body 310A configuring the first through portion 314 may have a U shape in a plan view.

In the first embodiment, the configuration is described in which the nut member 235 is integrated with the second plate body 230A. However, the nut member 235 may be separately configured.

Also in the second embodiment, the configuration is described in which the nut member 315 is integrated with the first plate body 310A. However, the nut member 315 may be separately configured.

Moreover, the second plate body 230A and the nut member 235, or the first plate body 310A and the nut member 315 may be integrally fixed to each other by a fixing method different from welding, and for example, may be integrally molded.

In the first embodiment, a configuration may be adopted in which a female screw is formed in the through-hole 234a of the second plate body 230A without providing the nut member 235.

Also in the second embodiment, a configuration may be adopted in which a female screw is formed in the through-hole 314a of the first plate body 310A without providing the nut member 315.

In the embodiments, the position adjustment portions 200 and 300 are used for the position adjustment of the blower unit 70. However, the position adjustment portions 200 and 300 may be used for position adjustments of other movable portions such as a grille 46.

In the embodiments, the wheel loader 100 is described as one example of the work vehicle of the present invention. However, for example, the present invention may be applied to other work vehicles such as a motor grader as the work vehicle. In addition, the present invention may be applied to other work vehicles including the cooling unit 50 and the blower unit 70.

INDUSTRIAL APPLICABILITY

According to the work vehicle and the position adjustment method of the movable portion of the work vehicle having the above-described aspects, it is possible to easily perform the position adjustment of the movable portion.

REFERENCE SIGNS LIST

10: rear frame, 20: bumper, 21: bumper center portion, 21a: upper surface, 22: bumper side portion, 22a: upper surface, 23: accommodation portion, 23a: upper surface, 24a: nonslip mat, 24b: nonslip mat, 30: exterior cover, 31: side cover, 32: top cover, 33: ventilation portion, 35: opening portion, 36: side edge portion, 37: upper edge portion, 38: lower edge portion, 40: support frame, 41: side frame, 42: upper frame, 43: rotating bracket, 44: fixing bracket, 44a: abutment surface, 44b: upper end surface, 44c: bolt fixing hole, 46: grille, 47: engine, 50: cooling unit, 51: rear surface, 60: fixation shroud, 70: blower unit (movable portion), 71: movable bracket, 72: rotation connection portion, 73: bracket body, 74: vertical frame portion, 75: horizontal frame portion, 76: fixing connection portion, 76*a*: outer surface, 76*b*: inner surface, 76*c*: outer end surface, 80: fan, 81: hydraulic motor, 82: fan body, 83: attachment portion, 84: blade, 85: guard portion, 90: movable shroud, 100: wheel loader, 110: vehicle body, 120: vehicle front portion, 130: vehicle rear portion, 140: front wheel, 150: rear wheel, 160: cab, 170: fuel tank, 180: work equipment, 181: boom, 182: bucket, 183: boom drive cylinder, 184: bucket drive cylinder, 185: link, 186: bell crank, 190: fixing bolt, 191: movable-side through-hole, 192: vehicle-side fixation hole, 200: position adjustment portion, 210: first plate, 211: upper surface, 212: lower surface, 213: side surface, 214: first through portion, 214*a*: opening portion, 214*b*: end portion, 215: long hole, 220: positioning bolt, 221: shaft portion, 222: head portion, 230: second plate, 230A: second plate body, 231: upper surface, 232: lower surface, 233: side surface, 234: second through portion, 234*a*: through-hole, 234*b*: female screw-hole, 235: nut member, 240: adjustment bolt, 241: shaft portion, 241*a*: male screw, 242: head portion, 300: position adjustment portion, 310: first plate, 310A: first plate body, 311: upper surface, 312: lower surface, 313: side surface, 314: first through portion, 314*a*: through-hole, 314*b*: female screw-hole, 315: nut member, 330: second plate, 331: upper surface, 332: lower surface, 333: side surface, 334: second through portion, R1: rear passage, R2: side passage, E: engine room, T: heat exchange room, O1: rotation axis, O2: reference axis, D1: rotation direction outside, D2: rotation direction inside, S1: positioning process, S2: lifting process

The invention claimed is:

1. A work vehicle, comprising:
a vehicle body that includes an opening portion communicating between inside and outside;
a movable portion that is rotatably supported to the vehicle body between a closed position at which the opening portion is closed and an open position at which the opening portion is open; and
a position adjustment portion that adjusts a vertical position of the movable portion when the movable portion is at the closed position, wherein the position adjustment portion includes
a first plate that is provided on the vehicle body and includes a first through portion which vertically penetrates the first plate,
a second plate that is provided on the movable portion, and includes a second through portion which vertically penetrates the second plate and communicates with the first through portion from below when the movable portion is at the closed position, and
an adjustment bolt that includes a shaft portion inserted into the first through portion and the second through portion; and
wherein the vehicle body includes a heat exchange room, wherein the opening portion is formed on a rear side of the heat exchange room, wherein a cooling unit that is provided inside the heat exchange room and has a rear surface facing the rear side is further provided, wherein the movable portion is a blower unit that includes a fan rotationally driven and a shroud covering the fan from an outer peripheral side, wherein the closed position is a position at which the blower unit faces the rear surface of the cooling unit, and wherein the open position is a position at which the blower unit exposes the rear surface of the cooling unit.

2. The work vehicle according to claim 1,
wherein the second through portion has a female screw on an inner peripheral surface of the second through portion,
wherein the shaft portion includes a male screw on an outer peripheral surface of the shaft portion, the male screw being capable of being fastened to the female screw, and
wherein the adjustment bolt further includes a head portion which is provided on an upper end of the shaft portion and abuts on an upper surface of the first plate.

3. The work vehicle according to claim 2,
wherein the first through portion is vertically opened toward a direction in which the movable portion is rotated to the open position.

4. The work vehicle according to claim 1,
wherein the first through portion has a female screw on an inner peripheral surface of the first through portion,
wherein the shaft portion includes a male screw on an outer peripheral surface of the shaft portion, the male screw being capable of being fastened to the female screw, and
wherein the adjustment bolt further includes a head portion which is provided on a lower end of the shaft portion and abuts on a lower surface of the second plate.

5. The work vehicle according to claim 4,
wherein the second through portion is vertically opened toward a direction in which the movable portion is rotated to the closed position.

6. The work vehicle according to claim 1,
wherein the first plate includes a long hole that vertically penetrates and has a horizontal direction as a longitudinal direction,
wherein the position adjustment portion further includes a positioning bolt that fixes the first plate to the vehicle body via the long hole.

7. The work vehicle according to claim 6,
wherein a longitudinal direction of the long hole is a horizontal direction that intersects a rotation direction of the movable portion.

8. The work vehicle according to claim 1,
wherein the vehicle body includes a vehicle-side fixation hole that penetrates in the horizontal direction,
wherein the movable portion includes a movable-side through-hole that penetrates in the horizontal direction and corresponds to the vehicle-side fixation hole when the movable portion is at the closed position, and
wherein a fixing bolt fixing the movable portion to the vehicle body via the vehicle-side fixation hole and the movable-side through-hole is further provided.

9. A position adjustment method of a movable portion of a work vehicle,
the work vehicle including
a vehicle body that includes an opening portion communicating between inside and outside,
a movable portion that is rotatably supported to the vehicle body between a closed position at which the opening portion is closed and an open position at which the opening portion is open, and
a position adjustment portion that adjusts a vertical position of the movable portion when the movable portion is at the closed position,
wherein the position adjustment portion includes
a first plate that is provided on the vehicle body and includes a first through portion which vertically penetrates the first plate, a second plate that is provided on the movable portion, and includes a second through portion which vertically penetrates the second plate and communicates with the first through portion from below when the movable portion is at the closed position, and an adjustment bolt that includes a shaft portion inserted into the first through portion and the second through portion; and wherein the vehicle body includes a heat exchange room, wherein the opening portion is formed on a rear side of the heat exchange room, wherein a cooling unit that is provided inside the heat exchange room and has a rear surface facing the rear side is further provided, wherein the movable portion is a blower unit that includes a fan rotationally driven and a shroud covering the fan from an outer peripheral side, wherein the closed position is a position at which the blower unit faces the rear surface of the cooling unit, and wherein the open position is a position at which the blower unit exposes the rear surface of the cooling unit, and wherein the method comprises:

a positioning process of coinciding a horizontal position of the second through portion with a horizontal position of the first through portion by rotating the movable portion; and a lifting process of allowing the second plate to be close to the first plate by inserting the shaft portion of the adjustment bolt into the first through portion and the second through portion and fastening the adjustment bolt after the positioning process.

10. The work vehicle according to claim 2, wherein the first plate includes a long hole that vertically penetrates and has a horizontal direction as a longitudinal direction, wherein the position adjustment portion further includes a positioning bolt that fixes the first plate to the vehicle body via the long hole.

11. The work vehicle according to claim 3, wherein the first plate includes a long hole that vertically penetrates and has a horizontal direction as a longitudinal direction, wherein the position adjustment portion further includes a positioning bolt that fixes the first plate to the vehicle body via the long hole.

12. The work vehicle according to claim 4, wherein the first plate includes a long hole that vertically penetrates and has a horizontal direction as a longitudinal direction, wherein the position adjustment portion further includes a positioning bolt that fixes the first plate to the vehicle body via the long hole.

13. The work vehicle according to claim 5, wherein the first plate includes a long hole that vertically penetrates and has a horizontal direction as a longitudinal direction, wherein the position adjustment portion further includes a positioning bolt that fixes the first plate to the vehicle body via the long hole.

14. The work vehicle according to claim 2, wherein the vehicle body includes a vehicle-side fixation hole that penetrates in the horizontal direction, wherein the movable portion includes a movable-side through-hole that penetrates in the horizontal direction and corresponds to the vehicle-side fixation hole when the movable portion is at the closed position, and wherein a fixing bolt fixing the movable portion to the vehicle body via the vehicle-side fixation hole and the movable-side through-hole is further provided.

15. The work vehicle according to claim 3, wherein the vehicle body includes a vehicle-side fixation hole that penetrates in the horizontal direction, wherein the movable portion includes a movable-side through-hole that penetrates in the horizontal direction and corresponds to the vehicle-side fixation hole when the movable portion is at the closed position, and wherein a fixing bolt fixing the movable portion to the vehicle body via the vehicle-side fixation hole and the movable-side through-hole is further provided.

16. The work vehicle according to claim 4, wherein the vehicle body includes a vehicle-side fixation hole that penetrates in the horizontal direction, wherein the movable portion includes a movable-side through-hole that penetrates in the horizontal direction and corresponds to the vehicle-side fixation hole when the movable portion is at the closed position, and wherein a fixing bolt fixing the movable portion to the vehicle body via the vehicle-side fixation hole and the movable-side through-hole is further provided.

* * * * *